May 8, 1951 — S. MISIC — 2,552,054
STAND FOR FOOD MIXERS
Filed June 12, 1947
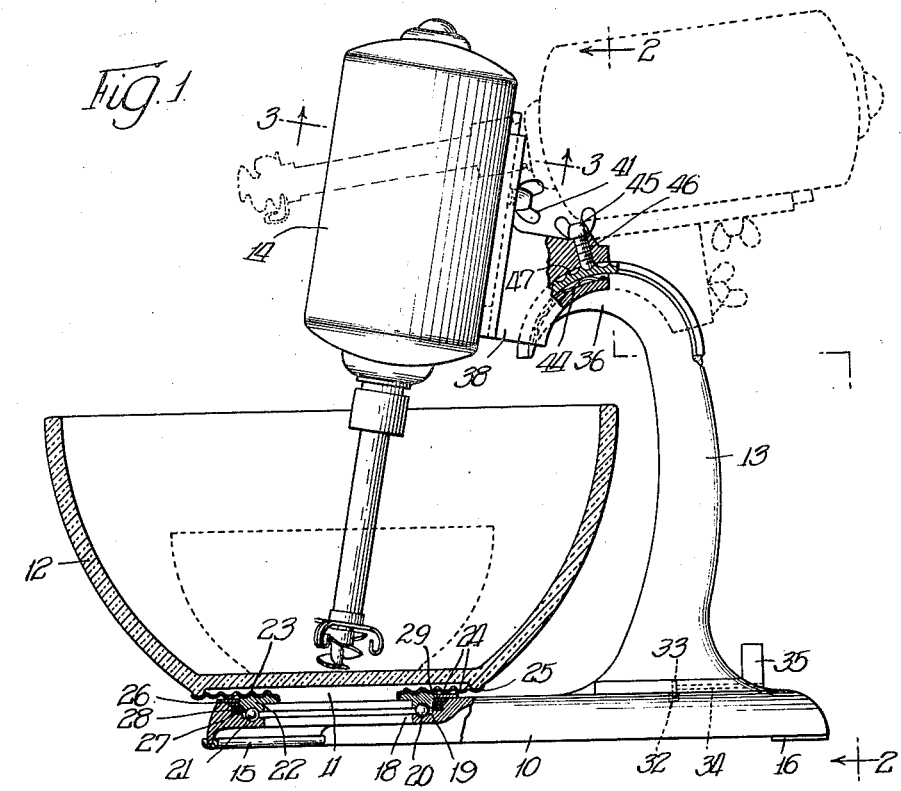
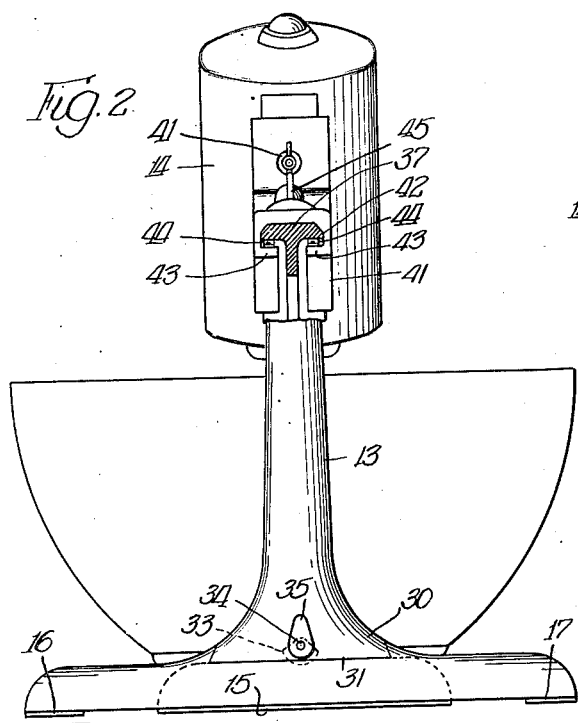
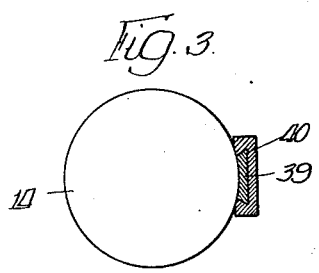
INVENTOR.
Stephen Misic,
BY Cromwell Greist + Warden
Attys Patented May 8, 1951

2,552,054

UNITED STATES PATENT OFFICE 2,552,054

STAND FOR FOOD MIXERS

Stephen Misic, Berwyn, Ill., assignor to Franklin Appliance Company, Chicago, Ill., a corporation of Illinois Application June 12, 1947, Serial No. 754,134

2 Claims. (Cl. 259—84)

1

This invention is concerned with a stand for supporting in cooperative relationship a mixing receptacle and a power driven domestic food mixer.

It is an object of the invention to provide an improved stand having a horizontal base provided with a rotatable table for supporting various sizes of mixing vessels and an upstanding arm for movably and detachably supporting thereon a household food mixer.

It is a further object of the invention to provide a mixer stand of the type described wherein the upstanding arm is readily removable and is provided on its upper end with an adjustable mounting bracket for the mixer which is movable in an arcuate path to support the mixer in a plurality of positions relative to the mixing vessel and wherein the rotatable table is so constructed that it will not rotate at an excessive speed.

These and other objects of the invention will be apparent from a description of the preferred form thereof which is shown by way of illustration in the accompanying drawings, wherein:

Fig. 1 is a side elevation with portions broken away of a mixer stand embodying the principles of the invention and having a mixer and a mixing vessel shown in position thereon;

Fig. 2 is an elevational view partly in section on the line 2—2 of Fig. 1; and

Fig. 3 is a section on the line 3—3 of Fig. 1.

Referring to the drawings, the improved mixer stand comprises a base 10 having a rotatable table 11 for supporting a mixing vessel or bowl 12 and an upstanding arm or post 13 for supporting an electrically driven household food mixer 14.

The base 10 is shaped to provide a forward portion supported by a rim or foot 15 and a somewhat wider rearward portion supported by spaced feet 16 and 17. The forward portion of the base 10 is provided with an aperture 18 having a surrounding shelf-like recess 19 which is provided with a groove forming one-half of a ball bearing race 20 for receiving the bearings 21.

A ring member 22 is received in the aperture 18 and is provided with a bearing receiving groove on its lower face which forms the other half of the ball bearing race 20. The ring member 22 is provided on its upper surface with a bowl supporting plate member 23 which extends radially outwardly of the ring member 22 and overhangs a portion of the base 10 surrounding the aperture 18. The plate member 23 is corrugated or provided with a series of concentric grooves 24

2 on its upper surface for receiving the bottom rim 25 of the mixing bowl 12. The grooves 24 are of varying diameters to adapt the table to accommodate various size mixing bowls. A smaller size bowl is indicated by the dotted line. The ring member 22 is positioned above the shelf-like recess 19 in the base 10 and held in position thereon by a retaining ring 26 which is secured by screws or the like to the base 10.

A ring of felt or similar friction material 27 is received in a groove 28 in the base 10 immediately above the recess forming the shelf-like portion 19 and is secured therein by an adhesive or the like. The friction material 27 frictionally engages in a groove or recess 29 provided in the lower face of the ring member 22. When the mixer 14 is adjusted on the post 13 with the axis of rotation of the beater elements off-center relative to the axis of rotation of the bowl supporting members the operation of the beater elements tends to rotate the mixing bowl. The friction ring 27 has sufficient frictional engagement with the ring member 22 to act as a brake and prevent undesirable spinning or excessive rotation of the mixing bowl.

The mixer supporting arm or post 13 is attached to the rear portion of the base 10 intermediate the lateral extremities thereof. The bottom of the post 13 is shaped to provide the male member 30 of a sliding dovetail connection, the female member being formed by a cooperating groove 31 in the base 10. The post 13 is held in proper fixed position by a latch arrangement comprising a transverse groove 32 formed in the base 10 and spaced inwardly a short distance from the rear edge thereof. A plate or cam member 33 is secured to an operating rod 34 having a handle 35 extending laterally thereto at the rear end of the base of the post. The plate 33 is so shaped that it may be engaged or disengaged in the groove 32 by rotation of the handle member 35.

The post 13 projects upwardly and has the general shape of an inverted J. The top end 36 is curved and has a T-shaped cross section providing a slide forming portion or head member 37 which receives a mounting block 38, to which the mixer 14 is secured, to position the mixer beater elements within the mixing bowl 12 (Fig. 1) or outside of the same as desired.

The mixer 14 is detachably connected to the mounting block 38 in any suitable manner, such as by a dovetail member 39 on the mixer which is adapted to engage in sliding relation in a groove 40 in the block 38. A thumb screw 41 is provided in the block 38 for securing the mixer 14 in adjusted position thereon.

The supporting block 38 is provided with a curved edge 41 having a groove 42 adapted to receive the T-shaped head portion 37 of the post 13. The groove 42 is partially enclosed by inwardly extending flange members 43 which are adapted to encompass the laterally extending portions of slide member 37 on the post 13. Spring members 44 are provided on the flange members 43 for holding the block in sliding relation with the slide portion 37 and for providing frictional engagement between the block 38 and the head. A thumb screw 45 is provided for screw-threaded engagement in a tapped hole 46 in the block 38, and a series of indents 47 are provided on the top surface of the slide portion 37 for engagement by the inner end of the thumb screw 45 to provide for locking the block 38 in various positions.

While specific materials and details of construction have been referred to in describing the illustrated form of the invention, it will be understood that other materials and other details of construction within the spirit of the invention may be resorted to.

I claim:

1. A stand for a food mixer comprising a base plate and an upstanding mixer supporting arm, said base plate having a relatively large circular recess adjacent the bottom end of the mixer supporting arm, a rotatably mounted bowl supporting ring member in said recess, a friction element in said recess which is engaged by said bowl supporting member to provide a braking means for preventing the bowl supporting member from rotating at excessive speeds, the top surface of said bowl supporting member having a series of concentric grooves thereon adapted to receive the bottom peripheral edge of various size mixing receptacles, said arm being detachably connected to said base plate and having a curved portion on the top thereof, a block member mounted for adjustable movement along said curved portion on the top of said arm, and means on the block member for detachably securing thereto the mixer whereby the mixer may be positioned with its beater elements extending into a bowl positioned on said supporting member.

2. In a stand for a food mixer having a base plate and an upstanding mixer supporting arm, said mixer supporting arm having a top portion provided with a curved track which is T-shaped in cross section, a block member having a curved recess with a cross section corresponding to the T-shaped track cross section mounted for movement on said track, a thumb screw for securing said block member in adjusted position on said track, and means on said block member for detachably securing thereto the mixer whereby the mixer may be selectively positioned with the beater elements thereof extending into a bowl positioned on the base plate adjacent the supporting arm or with the beater elements raised above the bowl.

STEPHEN MISIC.

REFERENCES CITED

The following references are of record in the file of this patent:

UNITED STATES PATENTS

| Number | Name | Date |
|---|---|---|
| 621,277 | Peckham | Mar. 14, 1899 |
| 1,054,617 | Regamey | Feb. 25, 1913 |
| 2,024,383 | Newnham | Dec. 17, 1935 |
| 2,028,408 | Mross | Jan. 21, 1936 |
| 2,031,770 | Gilbert | Feb. 25, 1936 |
| 2,415,939 | Doner | Feb. 18, 1947 |

FOREIGN PATENTS

| Number | Country | Date |
|---|---|---|
| 168,004 | Switzerland | June 1, 1934 |